(12) United States Patent
Li

(10) Patent No.: US 9,188,278 B1
(45) Date of Patent: Nov. 17, 2015

(54) LIFTING SUPPORT STRUCTURE

(71) Applicant: Chin-Chu Li, Taichung (TW)

(72) Inventor: Chin-Chu Li, Taichung (TW)

( * ) Notice: Subject to any disclaimer, the term of this patent is extended or adjusted under 35 U.S.C. 154(b) by 0 days.

(21) Appl. No.: 14/280,207

(22) Filed: May 16, 2014

(51) Int. Cl.
*A47B 9/00* (2006.01)
*F16M 11/28* (2006.01)
*F16M 11/42* (2006.01)

(52) U.S. Cl.
CPC .............. *F16M 11/28* (2013.01); *F16M 11/42* (2013.01)

(58) Field of Classification Search
CPC .............. A47B 9/04; A47B 9/10; A47B 9/00; A47B 9/20; A47B 27/14; A47B 27/16; A47C 3/30; B66F 1/06
USPC .................. 108/147; 248/161, 423, 354.7, 248/125.1–125.3, 352, 188.2, 157, 422, 248/295.11; 297/344.18, 474
See application file for complete search history.

(56) References Cited

U.S. PATENT DOCUMENTS

| 2,609,862 | A | * | 9/1952 | Pratt ........................ 297/344.19 |
| 3,828,694 | A | * | 8/1974 | Nestler et al. .................... 108/10 |
| 3,908,944 | A | * | 9/1975 | Bjork ......................... 248/162.1 |
| 4,061,304 | A | * | 12/1977 | Schattmaier ................... 248/404 |
| 5,269,501 | A | * | 12/1993 | Liegel et al. ..................... 269/17 |
| 5,437,236 | A | * | 8/1995 | Zeiner ........................... 108/147 |
| 6,343,556 | B1 | * | 2/2002 | Lanphear ....................... 108/147 |
| 6,874,432 | B2 | * | 4/2005 | Lanphear ....................... 108/147 |
| 8,763,963 | B1 | * | 7/2014 | Li ............................... 248/125.9 |
| 2007/0266913 | A1 | * | 11/2007 | Hardt ............................ 108/147 |
| 2008/0257131 | A1 | * | 10/2008 | Nakata ............................ 84/426 |
| 2010/0084534 | A1 | * | 4/2010 | Greenwood ................... 248/404 |
| 2012/0181407 | A1 | * | 7/2012 | Nemish ......................... 248/423 |
| 2013/0104695 | A1 | * | 5/2013 | Kleifgen et al. .............. 74/99 R |

FOREIGN PATENT DOCUMENTS

| DE | 3515491 | * | 10/1986 |
| TW | M392601 U1 | | 11/2010 |
| TW | M407328 U1 | | 7/2011 |
| TW | 201302184 A | | 1/2013 |

OTHER PUBLICATIONS

Technical Evaluation Report dated Jun. 26, 2015 of the corresponding Taiwan utility model application.

* cited by examiner

*Primary Examiner* — Janet M Wilkens
(74) *Attorney, Agent, or Firm* — Chun-Ming Shih; HDLS IPR Services

(57) ABSTRACT

A lifting support structure includes an actuating element having a cylinder and a movable rod moved reciprocally in the cylinder. A bearing seat is disposed on a lateral side of the actuating element, and one end of the movable rod is inserted in the bearing seat. A connecting rod is pivoted on the bearing seat and can pivot in the horizontal direction relative to the bearing seat. One end of the connecting rod is connected with the movable rod, and the other end is suspended freely. And a pedal is connected on the free end of the connecting rod.

7 Claims, 8 Drawing Sheets

LIFTING SUPPORT STRUCTURE

BACKGROUND OF THE INVENTION

1. Field of the Invention

The present invention generally relates to a supporting device and, in particular to a lifting support device for lifting a panel.

2. Description of Prior Art

The touch panels are widely used in various places by people with a progress and maturity of the touch panel technology, such as navigation systems in exhibitions or personal displays in a conference room.

In operation, the panel is usually required to fix at a certain height for providing feasible view for user. However, the panels are mostly fixed on a wall or assembled on a supporter or embedded in a desk that users cannot adjust the height of the panel as demands.

Moreover, few panel supporters that can be adjusted to get a required height by manual adjustment of the fixed location of a telescopic rod. However, such adjustment is time-consuming and laborious. Besides, a fixed position of a telescopic rod is usually located below the panel, and users need to squat aside the panel support to adjust the height of the panel. Therefore that is inconvenient for users.

In view of the above drawbacks, the Inventor proposes the present invention based on his expert knowledge and elaborate researches in order to solve the problems of prior art.

SUMMARY OF THE INVENTION

Accordingly, an object of the present invention is to provide a lifting support structure, in which the object which linked with the first end of the movable rod will be moved with the actuating element for lifting.

In order to achieve the object mentioned above, the present invention provides a lifting support structure including an actuating element, a bearing seat, a connecting rod and a pedal. The actuating element includes a cylinder and a movable rod moved reciprocally in the cylinder. The movable rod has a first end and a second end disposed oppositely. The bearing seat is disposed on a lateral side of the actuating element, and second end of the movable rod is inserted in the bearing seat. The connecting rod is pivoted on the bearing seat and can pivot in a horizontal direction relative to the bearing seat. The connecting rod has a fix end and a free end disposed oppositely. The fix end is connected with the second end of the movable rod, and the free end is suspended freely. The pedal is connected on the free end of the connecting rod.

Comparing to the prior art, the lifting support structure of the present invention includes an actuating element, a bearing seat, a connecting rod and a pedal. When users exert on an end the pedal, the pedal will bring the connecting rod pivoted on the bearing seat to move together, and the connecting rod will move along with the actuating element in a longitudinal direction. Similarly, force exerted on the other end of the pedal will make the actuating element moving in another direction. Therefore, the actuating element can bring the linked object moving upward or downward to get to a location where the object needed.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
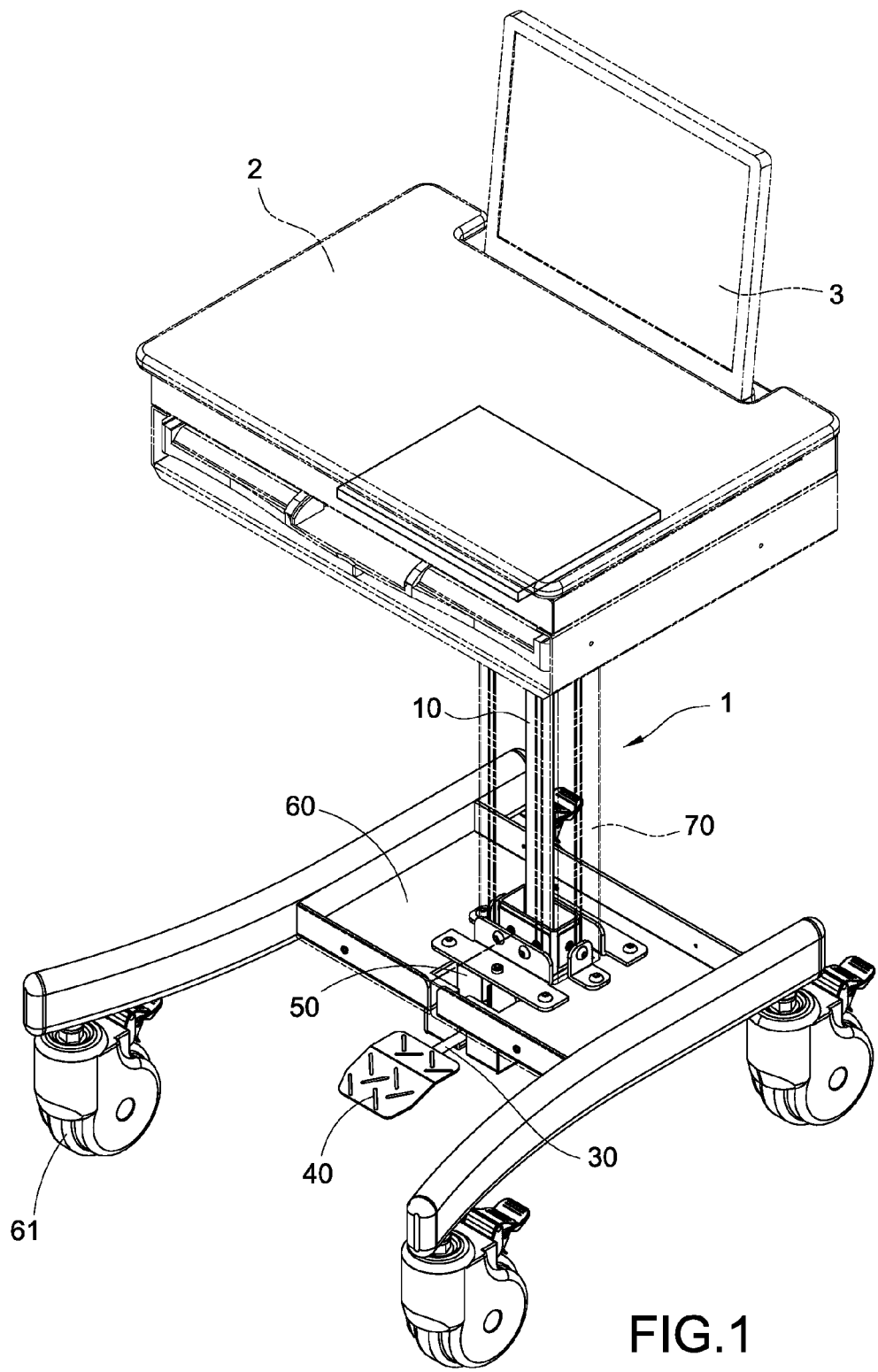
FIG. 1 is a perspective schematic view of a lifting support structure of the present invention.
Figure 2:
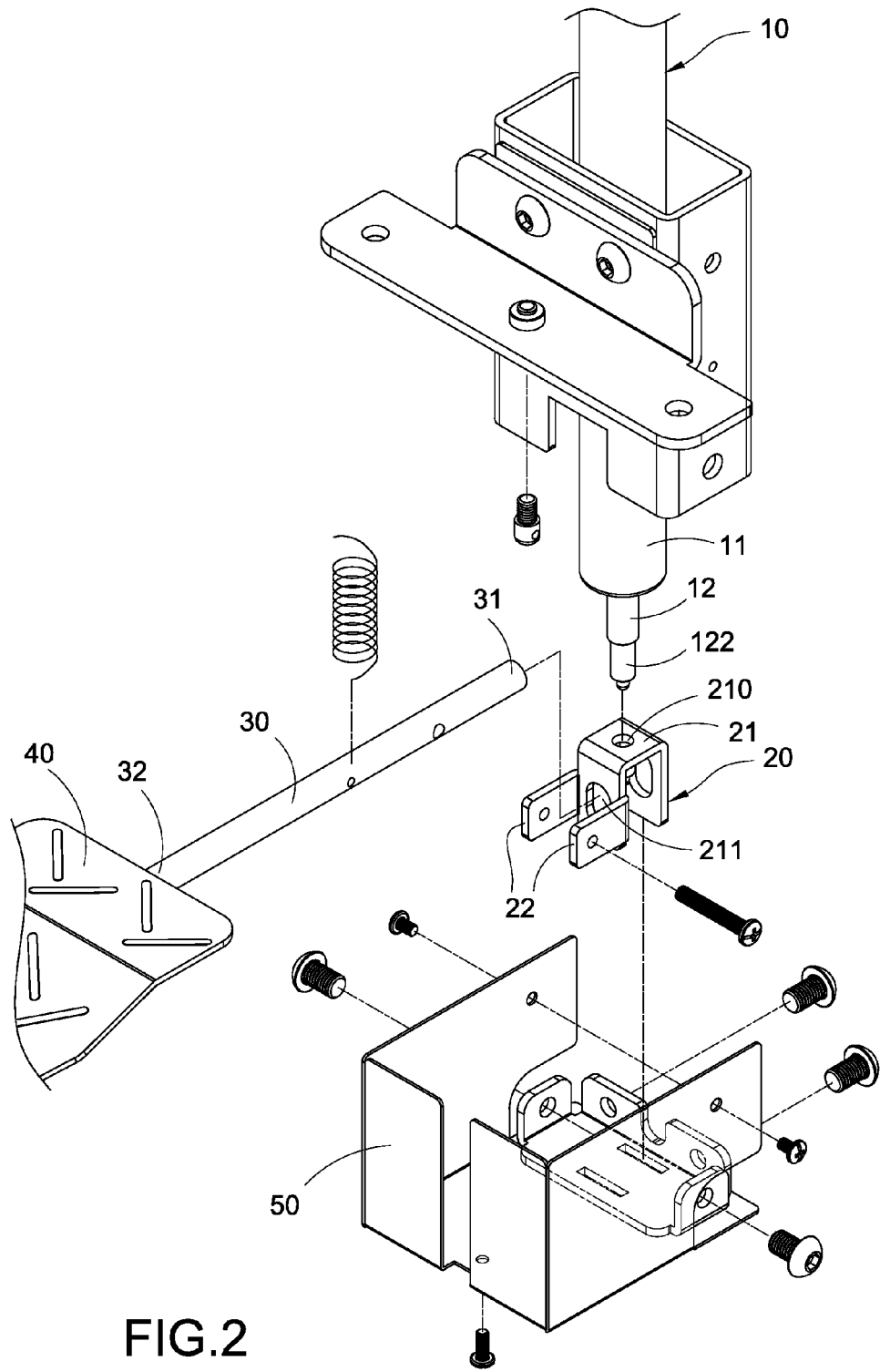
FIG. 2 is a perspective exploded view of a lifting support structure of the present invention.
Figure 3:
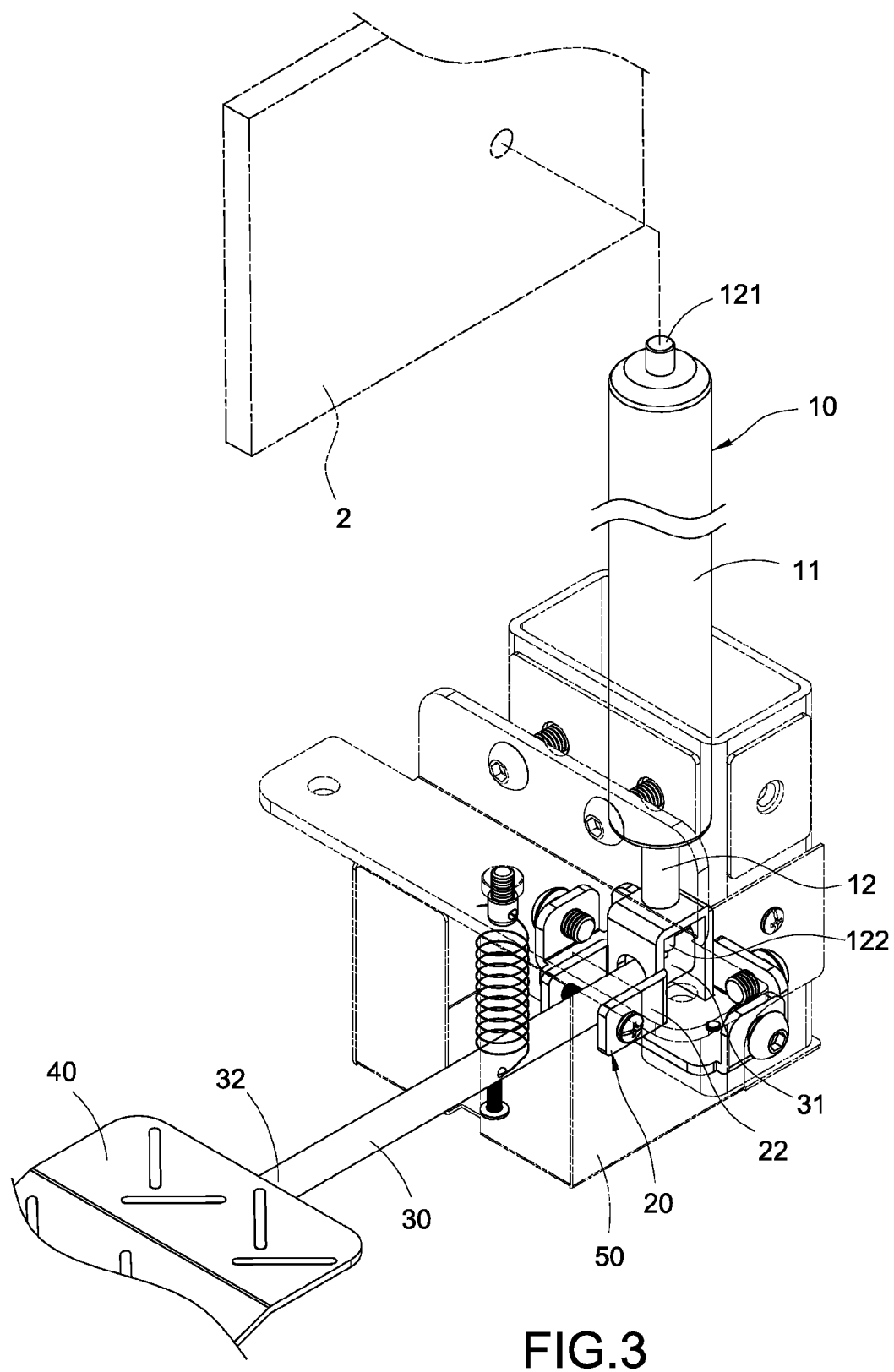
FIG. 3 is an assembled view of an actuating element of the present invention.

Please refer to FIG. 1 to FIG. 3, they depict a perspective schematic view of a lifting support structure, a perspective exploded view of a lifting support structure and an assembled view of the actuating element of the present invention. The lifting support structure 1 comprises an actuating element 10, a bearing seat 20, a connecting rod 30 and a pedal 40. The bearing seat 20 is provided for connecting the actuating element 10 and the connecting rod 30, and the pedal 40 is connected with the connecting rod 30. The connecting rod 30 is moved with the actuating element 10 after an external force is exerted on, and then the actuating element 10 has a linear movement.

The actuating element 10 is, but not limited to, a gas cylinder, a hydraulic cylinder or a lift cylinder having a restoring force. The actuating element 10 includes a cylinder 11 and a movable rod 12 moved reciprocally in the cylinder 11. The movable rod 12 has a first end 121 and a second end 122 disposed oppositely, and the first end 121 is connected with an object. In the present embodiment, the object is a table 2, and a panel 3 is disposed on the table 2. The lifting support structure 1 of the present invention can bring the table and the panel 3 moving upward or downward and can be positioned at a certain height to meet user's requirement.

In an embodiment of the present invention, the lifting support structure 1 further includes a control box 50, a platform 60 and a plural of rollers 61 provided on the bottom of the platform 60. The actuating element 10 and the bearing seat 20 are disposed on the control box 50. One end of the connecting rod 30 is protruded out of the control box 50, and the pedal 40 is located at a lateral side outside the control box 50. Furthermore, the control box 50 is installed on the platform 60, and the lifting support structure 1 can be easily moved to other places by the platform 60 with the rollers 61.

As shown in FIG. 2 and FIG. 3, the bearing seat 20 is disposed on a lateral side of the actuating element 10, and second end 122 of the movable rod 12 is inserted in the bearing seat 20. Besides, the connecting rod 30 is pivoted on the bearing seat 20 so that it can pivot in a horizontal direction relative to the bearing seat 20. The connecting rod 30 has a fix end 31 and a free end 32 disposed oppositely. The fix end 31 is connected with the second end 122 of the movable rod 12, and the free end 32 is suspended freely. Moreover, the pedal 40 is connected on the free end 32 of the connecting rod 30. More details of the configurations are described as following.

In an embodiment of the present invention, the bearing seat 20 has a U-shaped frame plate 21 and a pair of pivoting arms 22 extending from the U-shaped frame plate 21. The second end 122 of the movable rod 12 is inserted in the U-shaped frame plate 21, and the fix end 31 of the connecting rod 30 is inserted through the pair of the pivoting arms 22 therebetween for connecting with the second end 122 of the movable rod 12.

Preferably, the U-shaped frame plate 21 has a through hole 210 for inserting the second end 122 of the movable rod 12 and a trough 211 for inserting the fixed end 31 of the connecting rod 30. The through hole 210 and the trough 211 are located on two adjacent sides of the U-shaped frame plate 21.

Figure 4:
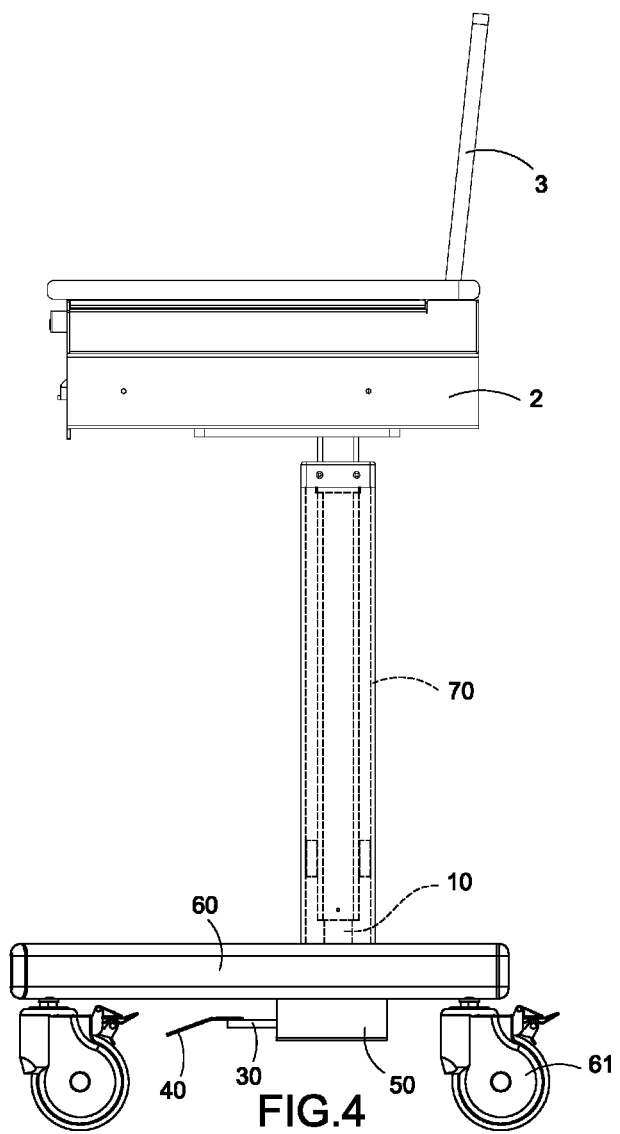
FIG. 4 is a side view of a lifting support structure of the present invention.
Figure 5:
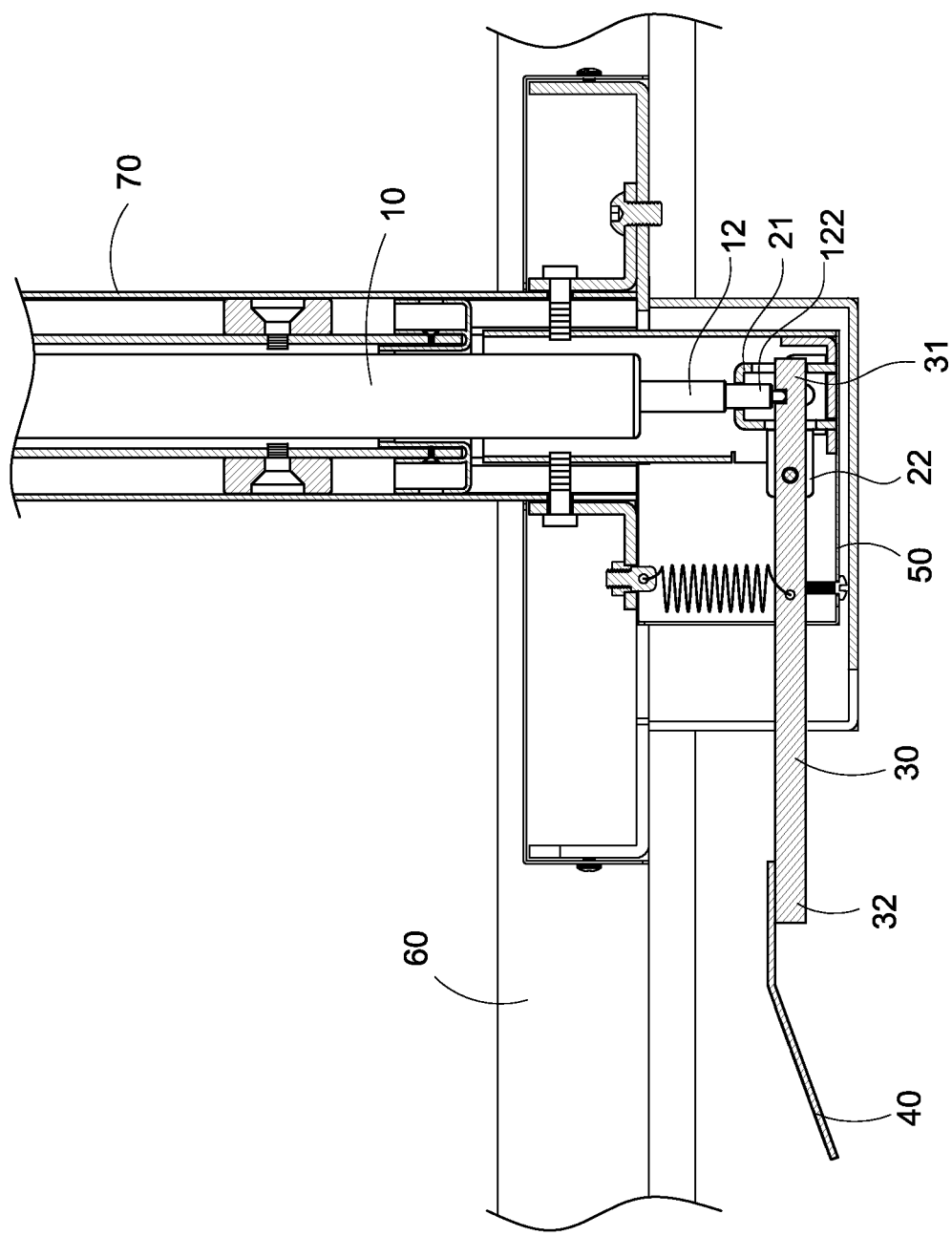
FIG. 5 is a partial assembly cross sectional view of the actuating element of the present invention.
Figure 6:
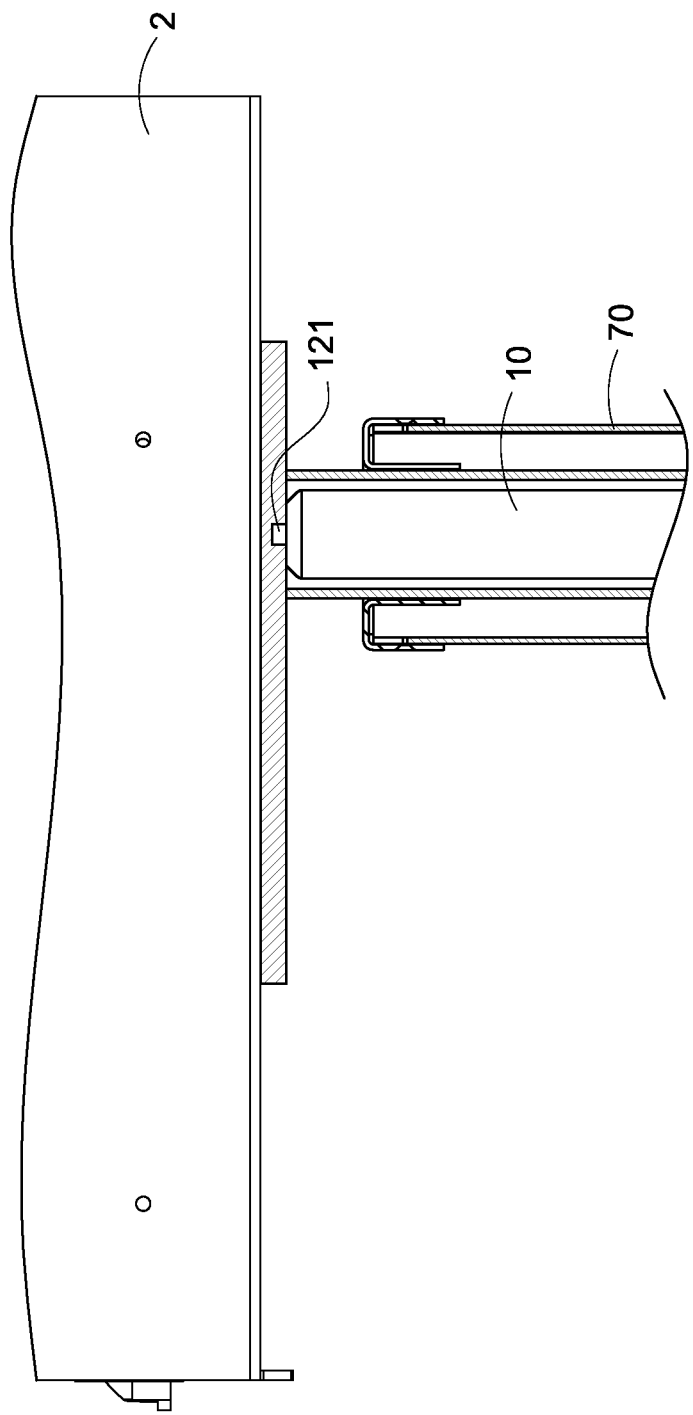
FIG. 6 is another partial assembly cross sectional view of actuating element of the present invention.

Please further refer to FIG. 4 to FIG. 6, they depict a side view of a lifting support structure and partial assembly cross sectional views of two sides of the actuating element. The lifting support structure 1 of the present invention further includes a hollow pillar 70, and the actuating element 10 is disposed in the hollow pillar 70. The movable rod 12 can move a distance upward or downward along a longitudinal direction 70 of the hollow pillar 70.

Figure 7:
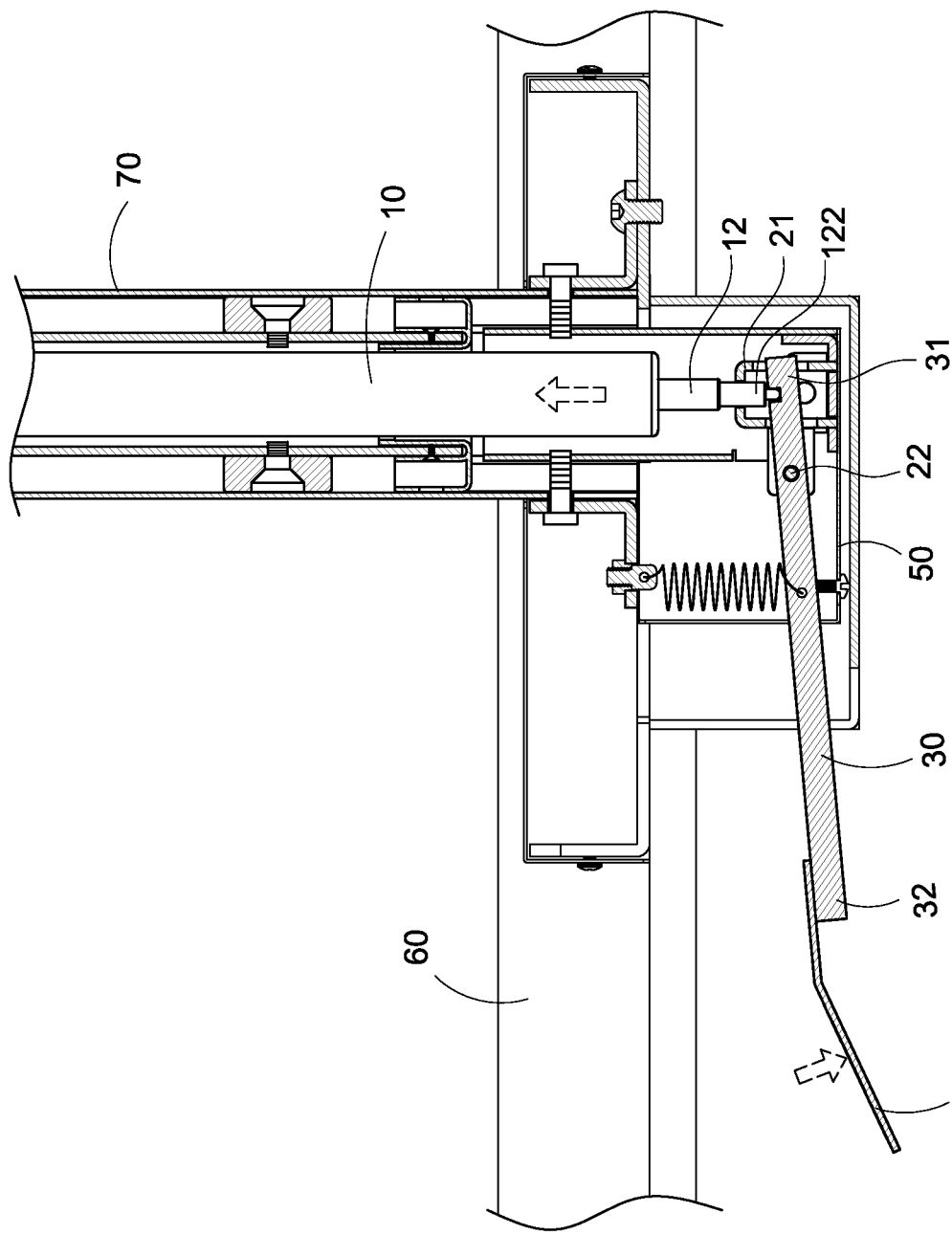
FIG. 7 is an operating schematic view of a lifting support structure of the present invention.

Please also refer to FIG. 7 and FIG. 7, they depict an operating schematic view and an application view of a lifting support structure of the present invention. The lifting support structure 1 of the present invention is provided for a user to stamp on the pedal 40. When the pedal is stamped downward, the connecting rod 30 pivoted on the bearing seat 20 will be linked for moving together. Then the fix end 31 of the connecting rod 30 will move upward and the second end 122 of the movable rod 12 will be pushed simultaneously. The movable rod 12 will move in a longitudinal direction 70 of the cylinder 11 and the hollow pillar 70, thus the first end 122 of the movable rod 12 will be moved upward.

Figure 8:
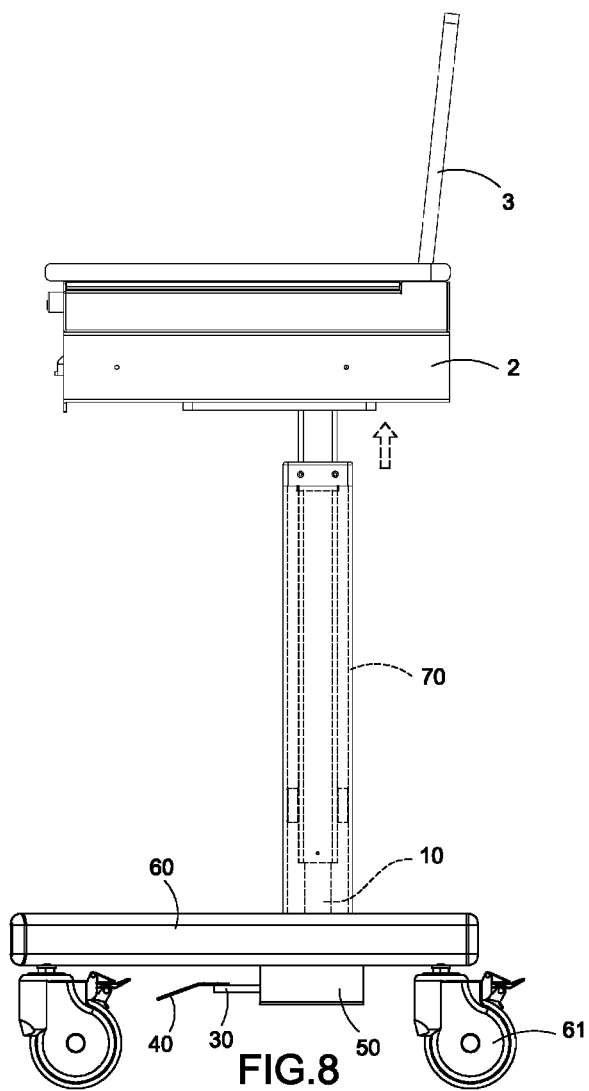
FIG. 8 is an application view of a lifting support structure of the present invention.

As shown in FIG. 8, when the first end 122 of the movable rod 12 is moved upward, the table 2 linked with the first end 122 of the movable rod 12 will be moved together. Therefore, the panel 3 disposed in the table 2 will be moved together with the table 2. In this way, the table 2 and the panel 3 can be moved upward or downward through the lifting support structure 1 of the present invention and located at a certain height which users required.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A lifting support structure comprising:
    an actuating element including a cylinder and a movable rod moved reciprocally in the cylinder, the movable rod having a first end and a second end disposed oppositely, and the first end being connected with an object;
    a bearing seat disposed on a lateral side of the actuating element, the second end of the movable rod being inserted in the bearing seat;
    a connecting rod pivoted on the bearing seat and pivoting in a horizontal direction relative to the bearing seat, the connecting rod having a fix end and a free end disposed oppositely, the fix end being connected with the second end of the movable rod and the free end being suspended freely; and
    a pedal connected on the free end of the connecting rod,
    wherein the bearing seat has a U-shaped frame plate and a pair of pivoting arms extending from the U-shaped frame plate, the second end of the movable rod is inserted in the U-shaped frame plate, and the fix end of the connecting rod is inserted through the pair of the pivoting arms therebetween for connecting with the second end of the movable rod.

2. The structure according to claim 1, wherein the actuating element is a gas cylinder, a hydraulic cylinder or a lift cylinder having a restoring force.

3. The structure according to claim 1, wherein the U-shaped frame plate has a through hole for inserting the second end of the movable rod and a trough for inserting the fixed end of the connecting rod, the through hole and the trough are located separately on two adjacent sides of the U-shaped frame plate.

4. The structure according to claim 1, further including a hollow pillar, wherein the actuating element is disposed in the hollow pillar.

5. A lifting support structure comprising:
    an actuating element including a cylinder and a movable rod moved reciprocally in the cylinder, the movable rod having a first end and a second end disposed oppositely, and the first end being connected with an object;
    a bearing seat disposed on a lateral side of the actuating element, the second end of the movable rod being inserted in the bearing seat;
    a connecting rod pivoted on the bearing seat and pivoting in a horizontal direction relative to the bearing seat, the connecting rod having a fix end and a free end disposed oppositely, the fix end being connected with the second end of the movable rod and the free end being suspended freely;
    a pedal connected on the free end of the connecting rod, and
    a control box, wherein the actuating element and the bearing seat are provided on the control box.

6. The structure according to claim 5, wherein one end of the connecting rod is protruded out of the control box, and the pedal is located at a lateral side outside the control box.

7. The structure according to claim 5, further including a platform and a plural of rollers provided on the bottom of the platform, wherein the control box is installed on the platform.

* * * * *